July 21, 1964  K. NITTKA  3,141,446
ROTARY ENGINE

Filed July 3, 1961  3 Sheets-Sheet 1

INVENTOR
Karl Nittka
BY Michael J. Striker
Attorney

July 21, 1964     K. NITTKA     3,141,446
ROTARY ENGINE

Filed July 3, 1961     3 Sheets-Sheet 2

INVENTOR
Karl Nittka
BY
Michael S. Striker
Attorney

July 21, 1964     K. NITTKA     3,141,446
ROTARY ENGINE

Filed July 3, 1961     3 Sheets—Sheet 3

INVENTOR.
Karl Nittka
BY Michael J. Striker
Attorney

United States Patent Office
3,141,446
Patented July 21, 1964

3,141,446
ROTARY ENGINE
Karl Nittka, Uhland Strasse 7, Wiesbaden, Germany
Filed July 3, 1961, Ser. No. 121,614
Claims priority, application Germany July 1, 1960
13 Claims. (Cl. 123—8)

The present invention relates to a rotary engine, and more particularly to a rotary combustion engine.

Rotary combustion engines are known in which a driving member meshes with a gear on a drive shaft and is consequently arranged eccentric to the axis of the same. The drive member is located in a non-circular casing and cooperates with the same to define chambers for the admitted and exhausted fuel.

The provision of gearing in the prior art not only increases the cost of manufacture, but is also the cause of rapid wear so that the span of life of motors of this type is short since the driving member performs irregular motions and beats against the casing.

Furthermore, the efficiency of the known motors of this type is comparatively low because the effective lever arm at which the expanding gas acts on the drive member, is comparatively small.

It is one object of the present invention to overcome the disadvantages of known engines of this type, and to provide an engine in which the drive member of rotor is not connected to the drive shaft by gearing.

Another object of the present invention is to provide a rotary engine in which a rotor forms expanding and contracting chambers with a casing while rotating and performing translations in two transverse directions.

Another object of the invention is to connect a rotor performing translations and rotary movements with a shaft by first guide means permitting relative movement in one direction, and second guide means permitting relative movement between the rotor and the shaft in another transverse direction.

Another object of the present invention is to provide a rotary combustion engine in which a fuel ignited in a chamber formed between the rotor and the stator expands to act with a comparatively great effective radius on the rotor of the engine.

Another object of the present invention is to provide a rotary combustion engine operating on the four stroke principle, but having no cylinders.

Another object of the present invention is to provide a rotary combustion engine in which the rotor, or rotary piston, performs two perpendicular translation movements, while rotating so that an expanding inlet chamber and a contracting outlet chamber is formed between the rotor and the stator.

Another object of the present invention is to provide igniting means which are automatically replaced by other igniting means when becoming inoperative.

With these objects in view, the present invention relates to a rotary engine, preferably a rotary combustion engine which comprises a stator, a rotor, a turnable member, for example a shaft, and drive means connecting the turnable member with the rotor for rotation and for translation in two directions transverse to each other. In the preferred embodiment of the invention, the stator has inlet means for fluid, for example a combustible gas, outlet means, and an inner cavity communicating with the inlet means and outlet means and having an endless guide track. The rotor is located in the cavity and has spaced parts guided along the endless guide track of the stator. During rotation of the rotor and turnable member, the above-mentioned parts of the rotor move along the endless guide track and form in the cavity an expanding chamber communicating with inlet means and a contracting chamber communicating with outlet means.

Another contracting chamber compresses gaseous fuel, and an igniting means is provided in a following expanding chamber to ignite the compressed fuel.

In a preferred embodiment of the invention, the drive shaft has a guide portion on which a guide body is guided for straight movement in one direction, and the guide body is guided along guide faces in an inner space of the rotor for straight movement in a transverse direction.

The rotor has a generally square cross-section with outwardly concave curved portions, and the endless track of the stator has two opposite track portions having the same radius of curvature, another track portion having a smaller radius, and a fourth track portion having a greater radius of curvature. One of the outwardly concave curved portions of the rotor has the same radius of curvature as the track portion which has the greatest radius of curvature so that exhaust gases can be completely discharged through the outlet.

The inner space in the rotor in which the guide body is guided, may be closed on one, or on both sides by lateral walls, and sealing rings are provided between the lateral rotor surfaces and the lateral corresponding surfaces of the enveloping stator.

Preferably, anti-friction means are provided between the guide body and the rotor and the prismatic guide portion of the drive shaft so that the friction losses are extremely small.

Since the preferred embodiment of the present invention constitutes a four stroke combustion engine corresponding to a piston motor having a single cylinder and piston, a failure of the igniting means will result in stopping of the engine. In a preferred embodiment of the invention, two spark plugs are provided only one of which is normally operative. Whenever the operative spark plug does not function, an automatic control arrangement connects the spare spark plug into the circuit so that the same is used. The switch from one spark plug to the other, is preferably indicated by an automatic indicator, for example a signal lamp. The switch to the second spark plug is preferably obtained by means which respond to the interruption of the circuit by the non-functioning spark plug.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
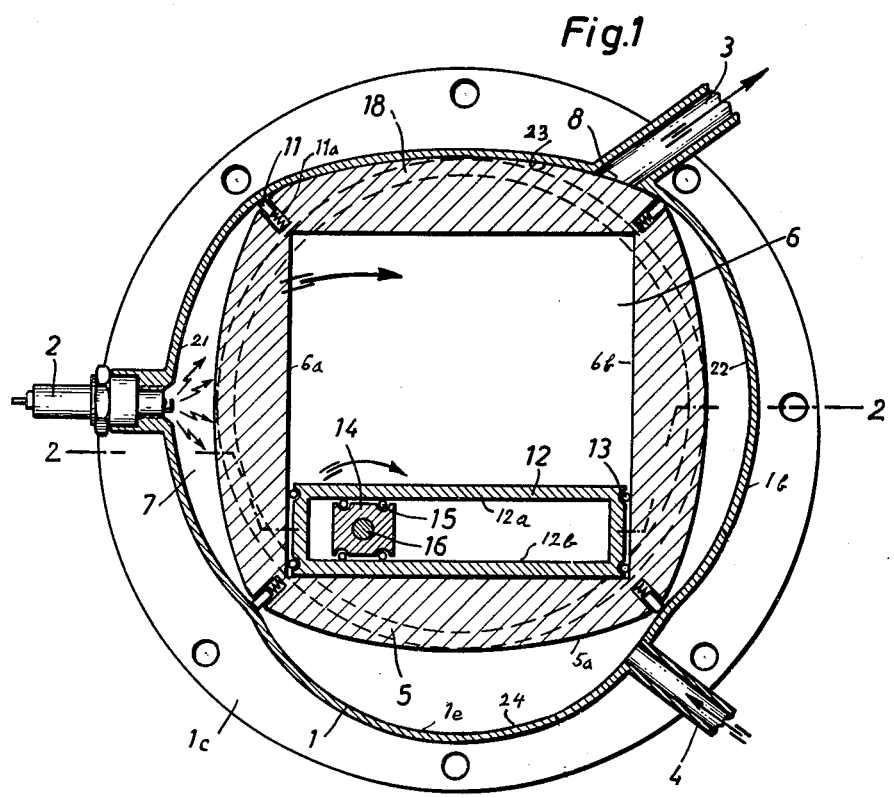
FIG. 1 is a cross-sectional view taken on line 1—1 in FIG. 2 and illustrating a combustion engine according to the present invention.
Figure 2:
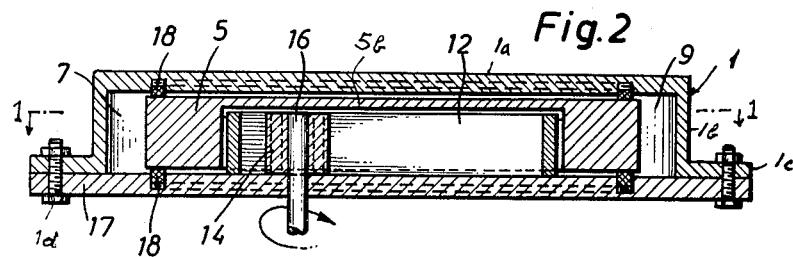
FIG. 2 is a sectional view taken on line 2—2 in FIG. 1.

Referring now to the drawings, and more particularly to FIGS. 1 and 2, a casing 1 has a lateral wall 1a, an annular wall 1b, and a flange 1c. Casing 1 is closed by lateral wall 17 which is secured to flange 1c by bolts 1d.

Outlet means 3 and inlet means 4 are provided on the annular wall 1b and open into the inner cavity of the casing 1. Annular wall 1b has a tubular projection in which an igniting means, shown to be a spark plug 2 is mounted. The sparking electrodes of spark plug 2 project into the interior of the cavity of the casing.

A rotor, rotary piston, or driving member 5 is located in casing 1, and has four corners which are spaced equal distances from each other and geometrically coincide with the four corners of a square. At each corner of rotor 5, a diametrically extending slot is provided in which a part 11 is movable. Springs 11a urge parts 11 outwardly, and into sliding engagement with the inner surface of the annular wall 1b, which constitutes an endless track along which parts 11 slide when rotor 5 turns relative to the stationary casing or stator 1. During rotation of rotor 5, the action of the centrifugal force will increase the pressure of parts 11 against the endless track 1e of annular wall 1b.

Rotor 5 has outwardly convex curved portions 5a having the same radius of curvature, and being preferably part-circular.

Rotor 5 has one lateral wall 5b bounding an inner space 6 on one side while the other side of space 6 is open, and confronts wall 17 of the casing. In a modified embodiment, another closure wall closes the open space 6 of rotor 5.

The inner space 6 has a square cross-section, as best seen in FIG. 1, and has corners aligned with parts 11 and the corners of the outer surface of rotor 5.

A guide body 12 is located in space 6, and is guided along two parallel straight guide faces 6a and 6b by anti-friction bearings, shown to be rollers 13. Guide body 12 is hollow and has an inner rectangular space on which a prismatic guide portion 14 of a drive shaft 16 is guided for movement along the inner guide faces 12a and 12b which extend perpendicular to the guide faces 6a and 6b of rotor 5. Anti-friction bearings, shown to be rollers 15, are located between the prismatic guide portion 14 and the guide faces 12a and 12b.

Drive shaft 15 extends out of the inner space 6 and through a corresponding bore in cover plate 17. Shaft 16 is supported for turning movement on a stationary bearing, and guide portion 14 is fixedly secured to the end of shaft 16, as best seen in FIG. 2.

It is evident that the guide means 6a, 6b, 12, and 14 not only connect rotor 5 with shaft 16 for rotation, but also permit a translation of rotor 5 relative to shaft 16 in two perpendicular directions, namely the direction of guide faces 6a and 6b, and the direction of guide faces 12a and 12b.

It is necessary to provide such guide means for two translation movements of rotor 5, since the endless track 1e of annular wall 1b is not of circular shape. Track 1e has four track portions. The opposite track portions 21 and 22 are part-circular, and have the same radius of curvature, which preferably is one-half of the distance between two diametrically located parts 11. Track portion 23 has the same radius of curvature as the outwardly convex faces 5a of rotor 5, such radius of curvature being greater than the radius of curvature of track portions 21 and 22. The fourth track portion 24 has a smaller radius of curvature than the other track portions. Due to the different radii of curvature of track portions 21, 22 and 24, inwardly projecting track portions are formed on the endless track 1e.

Figure 3A:
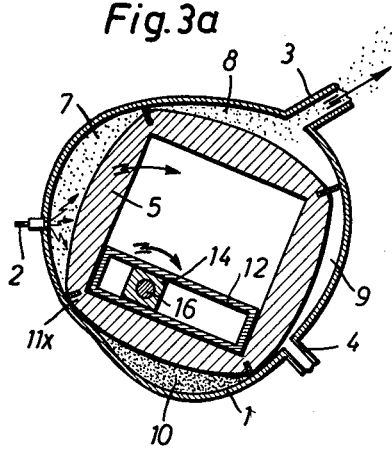
FIGS. 3a, 3b, 3c and 3d are cross-sectional views corresponding to FIG. 1 but showing on a reduced scale successive operational positions of the engine.

Since the movable parts 11 are in engagement with the endless track 1e, four chambers 7, 8, 9, and 10 are formed between the outwardly convex portions 5a of rotor 5, and the track portions 21 to 24, as best seen in FIG. 3a. In FIG. 1, chamber 8 is reduced to the volume of the outlet 3 in which a check valve, not shown, is provided.

The spark plug 2 is located in chamber 7, and substantially at the center of the track portion 21. In the position of FIG. 3a, outlet means 3 communicates with chamber 8, and inlet means 4 communicates with chamber 9. Chamber 10 is separated from the inlet and outlet means. In order to prevent communication between chambers 7 to 9 along the lateral faces of rotor 5 and casing 1, sealing rings 18 are provided between the confronting lateral inner surfaces of casing 1, and the opposite lateral surfaces of rotor 5, as best seen in FIG. 2.

Circular grooves are provided for this purpose in walls 1a and 17 of casing 1. Wall 5b is preferably provided with circular and radial ridges cooperating with the inner lateral surface of the casing wall 1a, and corresponding ridges are provided on the opposite annular surface of rotor 5 which confronts the lateral inner surface of cover 17. In the modified embodiment in which the inner space 6 is closed on both sides by walls, the additional lateral wall is also provided with radial and circular ridges.

The ridges are not shown in FIG. 2 for the sake of clarity, and have the effect of labyrinth seal.

Due to the fact that the track portions 21 to 24 of track 1e have different radii of curvature, chambers 7 and 9 expand, and chambers 8 and 10 contract during rotation of rotor 5 in stator 1. At the beginning of a four stroke cycle, rotor 5 is in the position shown in FIG. 1. Chamber 7 is filled with compressed gaseous fuel, and when a spark is created by the spark plug 2 in the position of FIG. 1, the fuel explodes in chamber 7 and expands, exerting pressure on rotor 5 which turns with shaft 15 about the axis of the same. It will be noted that the effective lever arm of the pressure which tends to turn rotor 5 in clockwise direction is substantially greater than the lever arm of the pressure which tends to turn rotor 5 in counterclockwise direction. Rotor 5 turns first to the position of FIG. 3a in which all the pressure of the expanding gases in chamber 7 produces a turning moment in clockwise direction, and then to the position movement in clockwise direction, and then to the position shown in FIG. 3b in which the effective lever arm of the expanding gases is further increased.

This is due to the fact that rotor 5 performs a translating movement relative to guide portion 14 while moving from the position of FIG. 1 to the position of FIG. 3a so that guide portion 14 appears to be displaced in FIG. 3a.

Figure 3B:
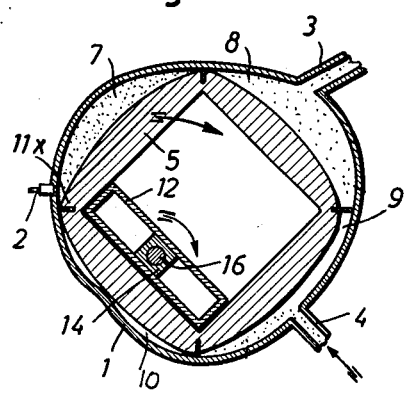
Figure 3C:
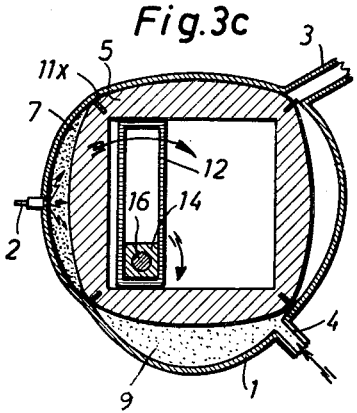
Figure 3D:
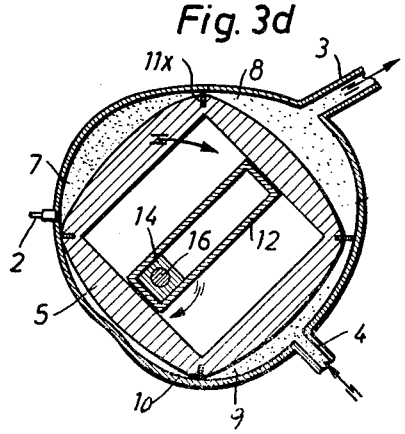

Further turning movement of rotor 5 requires a second translation which is obtained by movement of the guide body 12 along guide faces 6a and 6b, as is particularly apparent from FIGS. 3c and 3d. It will be noted that in the position of FIG. 3c, guide portion 14 is at the opposite end of guide body 12, as compared with FIG. 1.

During the translation movements of rotor 5 relative to shaft 16, there is a positive connection maintained between rotor 5 and shaft 16 through the guide faces 6a, 6b, guide body 12, guide faces 12a and 12b and guide portion 14, so that the turning moment acting on rotor 5 is positively transmitted to shaft 16.

In the position of FIG. 3a, the movable part 11x has moved a short distance on track portion 21, rotor 5 is located slightly higher relative to shaft 16, as compared with the position of FIG. 1, chamber 7 expands, and chamber 8 contracts so that gas is expelled from chamber 8 through outlet 3.

In the position of FIG. 3b, part 11x approaches the spark plug 2, chamber 9 expands and sucks new fuel through inlet 4, and chamber 10 is substantially eliminated so that the fuel is compressed. After the position of FIG. 3b, the burned gas is in chamber 8, which contracts until the position of FIG. 3c is reached in which all gas is expelled through outlet 3 while the compressed gas is ignited in chamber 7. The check valve in outlet 3 closes, and the turning rotor 5 produces negative pressure in the expanding chamber 9 so that fuel is sucked in through inlet 4. As shown in FIG. 3d, the fuel is compressed in chamber 10, and then enters chamber 7 in which it is ignited. Consequently during each quarter turn of the rotor, an explosion, a discharge of burned gases, the intake of fresh fuel, and a compression of the fresh fuel takes place.

Figure 4:
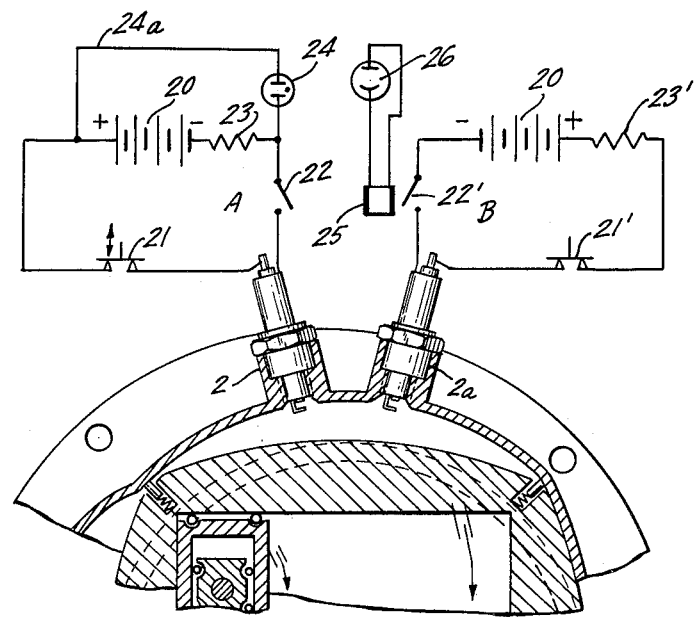
FIG. 4 is a diagram illustrating the igniting circuit according to a modified embodiment of the invention.

Conventional piston combustion engines have several cylinders so that failure of one spark plug permits continued operation of the motor. In the combustion engine of the invention, failure of the single spark plug 2 will result in stopping of the motor as soon as its inertia is exhausted. Therefore, it is preferred to provide a second spark plug 2a projecting into chamber 7 as shown in FIG. 4. Only one spark plug 2 is normally connected into the circuit A and is operative. Spark plug 2 is connected into a circuit A which includes an interrupter contact 21, the battery 20, a resistor 23, and the main switch 22. A shunting circuit portion 24a includes a glow discharge tube 24. The second spark plug 2a is connected into a corresponding circuit B in which corresponding parts are indicated by primed reference numerals. Switch 22' is operated by a relay 25 under control of a photoelectric cell 26 which receives light from the glow discharge tube 24.

When spark plug 2 does not function, its resistance is infinite, so that no current flows in circuit A so that the glow discharge tube 24 ignites and produces a light signal. Since the inner resistance of the glow discharge tube 24 is substantially greater than the resistance of circuit A it is not ignited during normal operation of the spark plug 2. On the other hand, the inertia of the glow discharge tube is sufficient to prevent an ignition of the glow discharge tube 24 at the frequency of the interruptors caused by the interrupting contact 21.

The light of the tube 24 energizes the photo cell 26 so that relay 25 closes switch 22', whereby, the second spare spark plug 2a is connected into the circuit B and performs the function of the inoperative spark plug 2. Since discharge tube 24 constitutes a signal lamp which automatically lights up when the second spark plug is connected into the circuit, the driver is informed of the fact that the spare spark plug 2a operates.

Due to the fact that the effective lever arm of the exploding fuel is very great, the efficiency of the engine is very high, particularly since the friction losses are low due to the provision of anti-friction bearings 13 and 15.

It will be understood that each of the elements described above, or two or more together, may also find a useful application in other types of rotary engines differing from the types described above.

While the invention has been illustrated and described as embodied in a rotary combustion engine including a rotor performing two perpendicular translations during rotation in a stator, it is not intended to be limited to the details shown, since various modifications and structural changes may be made without departing in any way from the spirit of the present invention.

Without further analysis, the foregoing will also fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rotary combustion engine comprising, in combination, a stator having inlet means for a fuel, outlet means, and an inner cavity communicating with said inlet means and outlet means and having an endless guide track and two lateral surfaces, said endless guide track having four curved track portions; a rotor located in said cavity and having a peripheral surface confronting said guide track and having four spaced parts guided along said endless guide track and four curved portions between said parts; an igniting means located on said stator in the region of one of said track portions; a turnable member mounted for turning movement about a stationary axis; and guide means connecting said turnable member with said rotor for rotation, and for translation in two directions transverse to each other and to said axis so that during rotation of said rotor and turnable member, said parts of said rotor move along said endless guide track and form in said cavity an expanding chamber communicating with said inlet means and a contracting chamber communicating with said outlet means, another contracting chamber for compressing the fuel, and another expanding chamber, said igniting means projecting into said last-mentioned chamber.

2. A rotary combustion engine comprising, in combination, a stator having inlet means for a fuel, outlet means, and an inner cavity communicating with said inlet means and outlet means and having an endless guide track and two lateral surfaces, said endless guide track having four curved inwardly concave track portions; a rotor located in said cavity and having a peripheral surface confronting said guide track and having four spaced parts guided along said endless guide track and being spaced from each other equal distances, said peripheral surface having four outwardly convex curved portions between said parts; an igniting means located on said stator in the region of one of said track portions; a turnable member mounted for turning movement about a stationary axis; and guide means connecting said turnable member with said rotor for rotation, and for translation in two directions transverse to each other and to said axis so that during rotation of said rotor and turnable member, said parts of said rotor move along said endless guide track and form in said cavity an expanding chamber communicating with said inlet means and a contracting chamber communicating with said outlet means, another contracting chamber for compressing the fuel, and another expanding chamber, said igniting means projecting into said last-mentioned chamber.

3. A rotary combustion engine comprising, in combination, a stator having inlet means for a fuel, outlet means, and an inner cavity communicating with said inlet means and outlet means and having an endless guide track and two lateral surfaces, said endless guide track having four curved inwardly concave track portions, two opposite track portions having the same radius of curvature, one of the other track portions having a smaller radius of curvature, and the remaining track portion having a greater radius of curvature than said opposite track portions; a rotor located in said cavity and having a peripheral surface confronting said guide track and having four spaced parts guided along said endless guide track and being spaced from each other equal distances, said peripheral surface having four outwardly convex curved portions between said parts, one of said outwardly convex curved portions having the same radius of curvature as said track portion having said greater radius of curvature; an igniting means located on said stator in the region of one of said opposite track portions; a turnable member mounted for turning movement about a stationary axis; and guide means connecting said turnable member with said rotor for rotation, and for translation in two directions transverse to each other and to said axis so that during rotation of said rotor and turnable member, said parts of said rotor move along said endless guide track and form in said cavity an expanding chamber communicating with said inlet means and a contracting chamber communicating with said outlet means, another contracting chamber for compressing the fuel, and another expanding chamber, said igniting means projecting into said last-mentioned chamber.

4. A combustion engine as set forth in claim 3 wherein said radius of curvature of said opposite track portions is substantially one half of the distance between two diametrically located guide parts of said guide parts of said rotor.

5. A combustion engine as set forth in claim 4 wherein said inlet means is located between said track portion having said greater radius of curvature, and the other of said opposite track portions; and wherein said outlet means is located between said other opposite track portion and said track portion having smaller radius of curvature.

6. A combustion engine as set forth in claim 3 wherein said igniting means is located at the center of the respective track portion, and wherein said outlet means includes a check valve means.

7. A combustion engine as set forth in claim 3 and including another igniting means adjacent said first mentioned igniting means; circuit means for connecting said igniting means to a source of voltage in such a manner that normally only said first igniting means is operative, and including means responsive to an increase of the resistance of said first mentioned igniting means causes by malfunction to connect said other igniting means to said source of voltage, and means for indicating the connection of said other igniting means to said source of voltage.

8. A rotary engine comprising, in combination, a stator having inlet means for a fluid, outlet means, and an inner cavity communicating with said inlet means and outlet means and having an endless guide track and two lateral surfaces; a rotor located in said cavity and having spaced radially movable parts guided along said endless guide track and being urged by the centrifugal force against said guide track, said rotor being of annular configuration and having an inner space bounded on two opposite sides by a pair of confronting straight guide faces, said rotor having two lateral surfaces confronting said lateral surfaces of said stator, and sealing rings between said lateral surfaces of said rotor and said stator; a turnable member mounted for turning movement about a stationary axis, said turnable member having a guide portion located in said inner space and having a pair of opposite straight guide faces extending perpendicular to said guide faces of said rotor; and a guide body having a first pair of parallel guide faces, and a second pair of parallel guide faces perpendicular to said first pair, said first and second pairs of guide faces being respectively guided on said guide faces of said rotor and on said guide faces of said guide portion of said turnable member so that during rotation of said rotor and turnable member, said parts of said rotor move along said endless guide track and form in said cavity an expanding chamber communicating with said inlet means and a contracting chamber communicating with said outlet means.

9. An engine as set forth in claim 8, said rotor including at least one lateral wall closing said inner space and having on the outside thereof concentric circular ridges and radial ridges adapted to form a labyrinth seal with the corresponding lateral surface of said stator.

10. An engine as set forth in claim 8 and including antifriction bearing means between said guide portion of said turnable member and said guide body, and other antifriction bearing means located between said guide body and said guide faces of said rotor.

11. A rotary combustion engine comprising, in combination, a stator having inlet means for a fuel, outlet means, and an inner cavity communicating with said inlet means and outlet means and having an endless guide track, said endless guide track having four curved inwardly concave track portions, two opposite track portions having the same radius of curvature, one of the other track portions having a smaller radius of curvature, and the remaining track portion having a greater radius of curvature than said opposite track portions; a rotor located in said cavity and having a peripheral surface confronting said guide track and having four spaced parts guided along said endless guide track and being spaced from each other equal distances, said peripheral surface having four outwardly convex curved portions between said parts, one of said outwardly convex curved portions having the same radius of curvature as said track portion having said greater radius of curvature, said rotor having an inner rectangular space bounded on two opposite sides by a pair of confronting straight guide faces; an igniting means located on said stator in the region of one of said opposite track portions; a turnable member mounted for turning movement about a stationary axis, said turnable member having a guide portion located in said inner space and having a pair of opposite straight guide faces extending perpendicular to said guide faces of said rotor; and a prismatic guide body having a first pair of parallel outer guide faces, and a second pair of parallel inner guide faces perpendicular to said first pair, said first and second pairs of guide faces being respectively guided on said guide faces of said rotor and on said guide faces of said guide portion of said turnable member so that during rotation of said rotor and turnable member, said parts of said rotor move along said endless guide track and form in said cavity an expanding chamber communicating with said inlet means and a contracting chamber communicating with said outlet means, another contracting chamber for compressing the fuel, and another expanding chamber, said igniting means projecting into said last-mentioned chamber.

12. A rotary combustion engine comprising, in combination, a stator having an inlet means for a fuel, outlet means, and an inner cavity communicating with said inlet and outlet means and having an endless guide track and two lateral surfaces, said endless guide track having four curved inwardly concave track portions, one of said track portions having a radius of curvature greater than the radius of curvature of the other track portions; a rotor located in said cavity and having a peripheral surface confronting said guide track and having four spaced parts guided along said guide track and being spaced from each other equal distances, said peripheral surface having four outwardly convex curved portions having each a radius of curvature substantially equal to that of said track portion having said greater radius of curvature; and igniting means located on said stator in the region of one of said other track portions; a turnable member mounted for turning movement about a stationary axis; and guide means connecting said turnable member with said rotor for rotation and for translation in two directions transverse to each other and to said axis so that during rotation of said rotor and turnable member, said parts of said rotor move along said endless guide track and form in said cavity an expanding chamber communicating with said inlet means, a contracting chamber communicating with said outlet means, another contracting chamber for compressing the fuel, and another expanding chamber.

13. A combustion engine as set forth in claim 12 in which said inner cavity of said stator communicates with said outlet means at said track portions having said radius of greater curvature.

References Cited in the file of this patent

UNITED STATES PATENTS

| 2,018,693 | Waite | Oct. 29, 1935 |
| 2,574,921 | Johnson | Nov. 13, 1951 |
| 2,684,038 | Johnson | July 20, 1954 |
| 2,947,290 | Freoede | Aug. 2, 1960 |
| 2,988,065 | Wankel et al. | June 13, 1961 |

FOREIGN PATENTS

| 673,265 | France | Oct. 7, 1929 |
| 843,183 | Germany | July 7, 1952 |